Nov. 21, 1933.  E. W. DAVIS  1,935,874
LUBRICATING APPARATUS
Filed May 11, 1931

Inventor:
Ernest W. Davis
By Williams, Bradbury,
McCaleb & Hinkle
Attys.

Patented Nov. 21, 1933

1,935,874

UNITED STATES PATENT OFFICE 1,935,874

LUBRICATING APPARATUS

Ernest W. Davis, Oak Park, Ill., assignor to Alemite Corporation, Chicago, Ill., a corporation of Delaware Application May 11, 1931. Serial No. 536,510

7 Claims. (Cl. 184—7)

My invention relates generally to lubricating apparatus and more particularly to an improved centralized lubricating system employing a novel form of measuring valve.

It is among the objects of my invention to provide an improved measuring valve for centralized lubricating systems in which the possibility of by-pass is reduced to a minimum, in which the rate of application of lubricant pressure does not materially affect the operation of the valve, and which will operate satisfactorily under widely differing conditions of use.

A further object is to provide a measuring valve which is simple in construction, which may be economically manufactured, and which will not readily get out of order.

Figure 1:
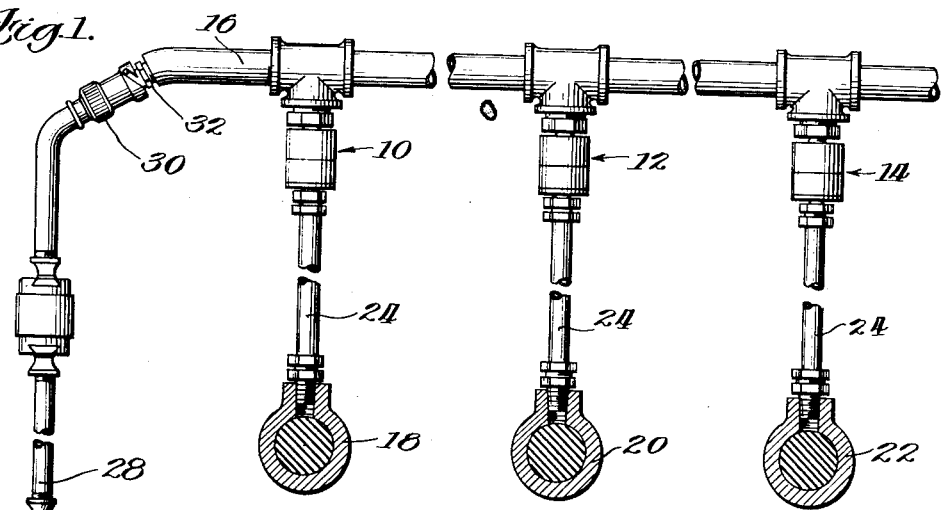
Figure 2:
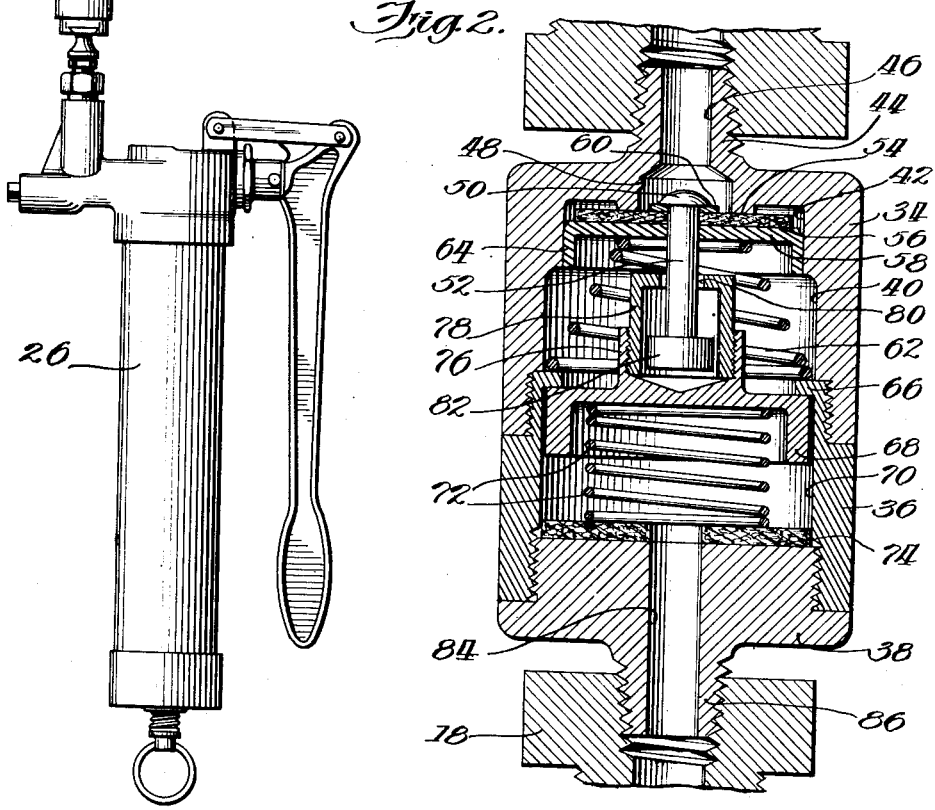

Other objects will appear from the following description, reference being had to the accompanying drawing, in which Fig. 1 is an elevation of a centralized lubricating system shown as applied to three bearings to be lubricated, the bearings being shown in section; and Fig. 2 is a central vertical sectional view of the improved measuring valve.

As illustrated in Fig. 1, a plurality of measuring valves 10, 12 and 14 are connected to a common lubricant supply conduit 16 and with bearings 18, 20 and 22, respectively, by conduits 24. While only three measuring valves and bearings are illustrated as connected to the conduit 16, it will be understood that these are merely representative of any desired large number which may be associated with the machine to be lubricated.

Any suitable means may be utilized to force lubricant under pressure into the conduit 16 and hence to the measuring devices 10, 12 and 14. In the usual practice a suitable power operated pump which will be effective intermittently to supply lubricant under high pressure to the conduit 16 at periodic intervals, will be used. The pump may include a periodically operated valve to accomplish this result.

For the sake of simplicity I have shown a hand operated lubricant compressor 26 connected by a jointed metal conduit 28, coupler 30 and pin fitting 32, as the means for supplying the lubricant to the conduit 16. These means are well known in the art and need not, therefore, be described in detail.

Each of the measuring devices comprises an upper body 34, lower body 36 and plug 38. The upper body has a cylindrical chamber 40 and a valve cylinder 42 formed therein. An externally threaded inlet connection 44 is formed integrally with the body 34 and has an axial inlet passageway 46 formed therein, the latter passageway being enlarged at 48 to receive the head 50 of a valve stem 52. An annular valve seat 54 is formed around the lower edge of the enlarged portion 48 of the passageway for engagement by a valve disk 56 which may be made of leather or other suitable material, this disk being held between a backing plate 58 and a small washer 60 by a relatively strong spring 62.

The backing plate 58 has a depending annular flange 64 which slides freely in the cylinder 42. The lower end of the conical compression spring 62 rests upon an inwardly extending annular flange 66 formed integrally with the lower body 36. A piston 68 fits loosely in the cylindrical bore 70 of the lower body 36 and is normally held with its upper surface abutting the lower surface of the flange 66 by a compression coil spring 72 which is weak as compared with the spring 62.

The lower end of the spring 72 rests upon an apertured gasket 74 and holds the latter in place over the plug 38. The piston 68 has an internally threaded boss 76 into which is threaded an inverted cup-shaped member 78. The latter has an opening 80 formed therein which is of slightly greater diameter than that of the stem 52. The stem 52 has an enlarged head 82 formed at its lower end. The cup-shaped member 78 and valve stem 52 thus form a lost motion connection between the valve and the piston.

The plug 38 has an outlet passageway 84 which extends axially through the externally threaded outlet connection 86 which is screwed into the bearing 18 to be lubricated.

The lubricating system employing the above-described measuring valve is, as above stated, adapted to be intermittently operated at periodic intervals, thereby to supply each of the bearings with a measured quantity of lubricant. In centralized lubricating systems of this general type the pressure in the conduit system must necessarily be built up relatively gradually. As the lubricant pressure is built up in the conduit 16 the pressure exerted upon the portion of the valve disk 56 which closes the end of the enlarged portion of the inlet passageway, will in time be sufficient to overcome the compression of spring 62 and move the valve a short distance from its seat 54.

As soon as lubricant can leak past the valve seat 54, the whole area of the valve will be subjected to the high lubricant pressure and therefore the valve will move downwardly very rapidly and the head 82 of the valve stem 52 will engage the piston 68 and start the latter moving downwardly. As soon as the backing plate 58 of the valve is moved downwardly a sufficient distance to permit flow of lubricant from the cylinder 42 to the chamber 40, lubricant pressure will be exerted upon the top of the piston 68 and force the latter downwardly against the compression of its spring 72. During this operation the lubricant within the cylinder 70 will have been forced to the bearing to be lubricated through the passageway 84.

At the lower end of its stroke the piston 68 will abut against the gasket 74 and be held thereagainst by lubricant pressure, thereby preventing flow of lubricant to the bearing. Upon relief of lubricant pressure in the conduit 16 the valve 56 will be forced upwardly toward its seat 54, the fit between the backing plate 58 and the walls of the cylinder 42 offering sufficient clearance to permit the slow by-pass of lubricant. As the valve moves upwardly the piston will also be forced upwardly by its spring 72, lubricant being by-passed around the piston which fits loosely in its cylinder.

Due to the lost motion connection between the valve and the piston the piston will be raised from its gasket seat 74 by the spring 62 as well as the spring 72, should the piston have a tendency to stick to its seat. Likewise, this type of connection insures operation of the piston 68 since before the valve may be completely opened the head 82 will strike the piston and start it upon its downward stroke. The valve will operate comparatively rapidly due to its strong spring while the piston will operate comparatively slowly upon its return stroke.

Both the valve and the piston will, however, operate very rapidly upon the downward stroke. The piston especially, due to the light spring which opposes its downward movement and its large area subjected to lubricant pressure, will move downwardly so rapidly that there will be extremely little, if any, by-passage of lubricant past the piston during its downward stroke.

Since the springs 62 of the various measuring valves connected to a common supply conduit 16 will vary slightly in their compressibility, the probabilities are that no two measuring devices will operate at the same instant. This is desirable so that each valve, as it operates, will have available the full discharge of the compressor for its operation. In other words, lubricant will flow rapidly into the measuring device without great reduction in lubricant pressure in the conduit system and cause the device to operate rapidly, thus reducing the possibility of by-passage of lubricant around the piston 68 of the device which is operating.

When all of the measuring devices have operated to discharge measured quantities of lubricant to their associated bearings, respectively, the operator will be apprized of this fact, either by noting from a pressure gauge (which may be connected to the conduit 16 at any suitable place) that the pressure in the conduit exceeds that necessary to operate the measuring valves, or by the fact that it is impossible for him to force additional lubricant into the conduit. If desired, means may be provided to relieve the pressure in the conduit although ordinarily the pressure will drop quite rapidly due to the slight leakage in one or more of the measuring devices.

While I have illustrated and described a specific embodiment of my invention, it will be understood that changes and modifications may be made in the details of construction, and I do not wish to be limited to the precise details shown but desire to avail myself of all changes within the scope of the appended claims.

I claim:

1. A lubricant measuring device comprising a body having an inlet passageway and an outlet passageway, a poppet-valve normally closing said inlet passageway, a cylinder in said body, a piston loosely fitting in said cylinder and operatively connected to said poppet-valve, a relatively strong spring for holding said poppet-valve in position to close said inlet passageway, and a relatively weaker spring for moving said piston toward said inlet passageway.

2. A lubricant measuring device comprising an inlet port of relatively small diameter, a relatively large diameter valve closing said port, a strong spring for holding said valve closed, a cylinder in said device, a piston reciprocable in said cylinder, a weak spring for moving said piston to one end of said cylinder, a lost motion connection between said valve and said piston, and a discharge port leading from said cylinder to a part to be lubricated.

3. A lubricant measuring device comprising a body having an inlet passageway and an outlet passageway, a poppet-valve for closing said inlet passageway, a cylinder in said body, a piston loosely fitting in said cylinder and having a lost motion connection with said poppet-valve, a relatively strong spring for holding said poppet-valve in position to close said inlet passageway, and a relatively weaker spring for moving said piston toward said inlet passageway.

4. A lubricant measuring device comprising a pair of contiguous communicating cylinders, the first of said cylinders having a port arranged to be connected to a source of lubricant supply, a valve in said first cylinder normally closing said port, a piston in said second cylinder, a lost motion connection between said valve and said piston, and resilient means for moving said valve and said piston, respectively.

5. A measuring device for centralized lubricating systems having a plurality of parts to be lubricated and conduits for supplying lubricant to said parts, comprising a body having an inlet port, a poppet-valve normally closing said port, a cylinder having a piston therein, a lost motion connection between said poppet-valve and said piston, a spring for moving said poppet-valve to closed position, and resilient means for moving said piston in one direction.

6. A measuring device for centralized lubricating systems in which a plurality of such devices are associated with bearings to be lubricated and connected by conduits with a central lubricating pump, comprising a body having an inlet port, a poppet-valve normally closing said port to prevent flow of lubricant from the pump to the bearing associated with the device, a cylinder having a piston therein, said cylinder being arranged to be supplied with lubricant when said poppet-valve is opened, a spring for moving said poppet-valve to closed position, and resilient means for moving said piston in one direction.

7. A lubricant measuring device comprising a body having an inlet, a valve normally closing said inlet, a piston, cylinders for said valve and piston respectively, a lost motion connection between said valve and piston, a relatively strong spring for holding said valve in its normal position, and a relatively weak spring for moving said piston.

ERNEST W. DAVIS.